United States Patent

DiFoggio et al.

(10) Patent No.: US 8,113,041 B2
(45) Date of Patent: Feb. 14, 2012

(54) GRAVITATIONAL METHOD AND APPARATUS FOR MEASURING TRUE VERTICAL DEPTH IN A BOREHOLE

(75) Inventors: Rocco DiFoggio, Houston, TX (US); Daniel T. Georgi, Houston, TX (US); Robert Estes, Tomball, TX (US)

(73) Assignee: Baker Hughes Incorporated, Houston, TX (US)

( * ) Notice: Subject to any disclaimer, the term of this patent is extended or adjusted under 35 U.S.C. 154(b) by 777 days.

(21) Appl. No.: 12/173,091

(22) Filed: Jul. 15, 2008

(65) Prior Publication Data

US 2009/0044618 A1 Feb. 19, 2009

Related U.S. Application Data

(60) Provisional application No. 60/956,544, filed on Aug. 17, 2007.

(51) Int. Cl.
*E21B 49/00* (2006.01)
*G01V 7/02* (2006.01)

(52) U.S. Cl. .............................. 73/152.05; 73/382 G

(58) Field of Classification Search ............... 73/382 G, 73/382 R, 152.59, 514.26, 152.05
See application file for complete search history.

(56) References Cited

U.S. PATENT DOCUMENTS

| | | | |
|---|---|---|---|
| 4,507,958 A | 4/1985 | Russell et al. | |
| 5,417,283 A | 5/1995 | Ejiogu et al. | |
| 5,860,475 A | 1/1999 | Ejiogu et al. | |
| 5,949,069 A | 9/1999 | Chace et al. | |
| 5,960,369 A | 9/1999 | Samaroo | |
| 6,305,216 B1 | 10/2001 | Samaroo | |
| 6,350,983 B1* | 2/2002 | Kaldor et al. | 250/231.1 |
| 6,473,187 B1* | 10/2002 | Manalis | 356/521 |
| 6,529,834 B1 | 3/2003 | Estes et al. | |
| 6,668,111 B2* | 12/2003 | Tapalian et al. | 385/28 |
| 6,763,718 B1* | 7/2004 | Waters et al. | 73/514.26 |
| 6,954,698 B2* | 10/2005 | Tryggvason | 702/5 |
| 7,069,780 B2 | 7/2006 | Ander | |
| 7,104,130 B2 | 9/2006 | Kenny et al. | |
| 7,142,985 B2* | 11/2006 | Edwards | 702/6 |
| 7,173,764 B2 | 2/2007 | Carr et al. | |
| 7,684,929 B2* | 3/2010 | Prange et al. | 702/9 |
| 7,707,883 B2* | 5/2010 | DiFoggio | 73/382 R |
| 7,743,661 B2* | 6/2010 | Berthold et al. | 73/653 |
| 7,793,543 B2* | 9/2010 | Csutak | 73/514.27 |
| 2006/0047430 A1* | 3/2006 | Edwards | 702/6 |

OTHER PUBLICATIONS

International Search Report for International Application No. PCT/US2008/072486. Mailed on Oct. 22, 2008.
Written Opinion of the International Searching Authority for International Application No. PCT/US2008/072486. Mailed on Oct. 22, 2008.
Loh, et al. Sub-10 cm3 Interferometric Accelerometer With Nano-g Resolution. Journal of Microelectromechanical Systems, vol. 11. No. 3, Jun. 2002. pp. 182-187.

* cited by examiner

*Primary Examiner* — John Fitzgerald
(74) *Attorney, Agent, or Firm* — Cantor Colburn LLP

(57) ABSTRACT

A method for measuring true vertical depth in a borehole, the method including: measuring gravitational acceleration in the borehole; and determining the true vertical depth from the measurement.

20 Claims, 8 Drawing Sheets

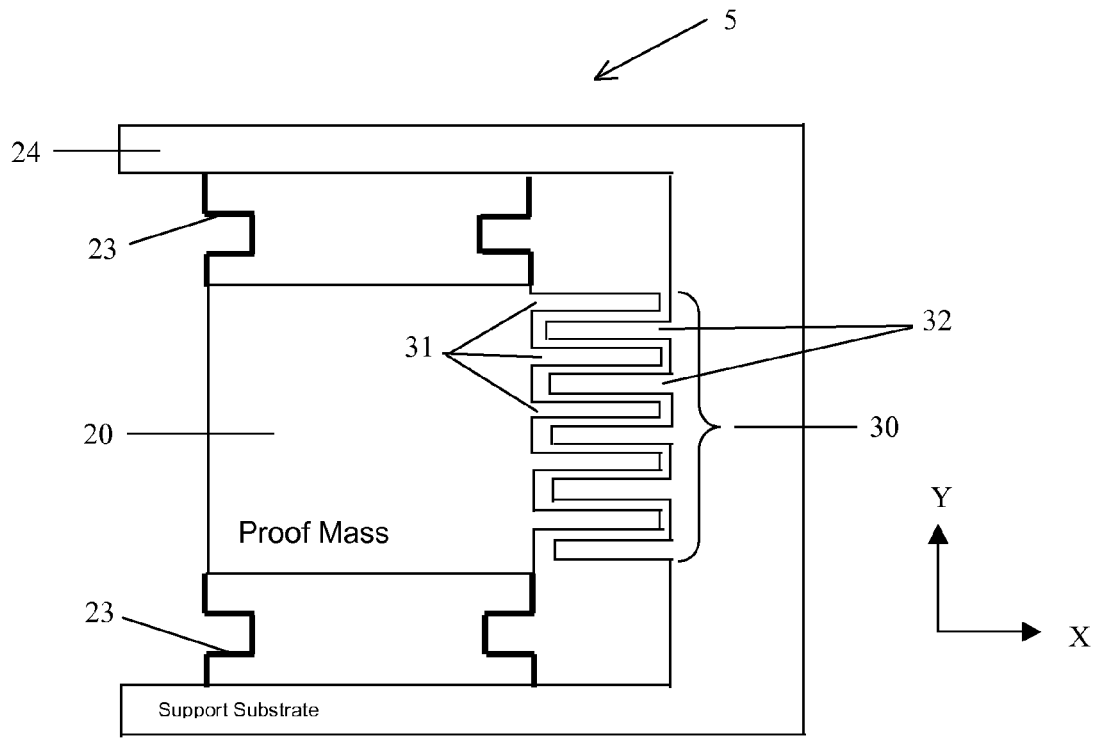
FIG. 3A  TOP VIEW
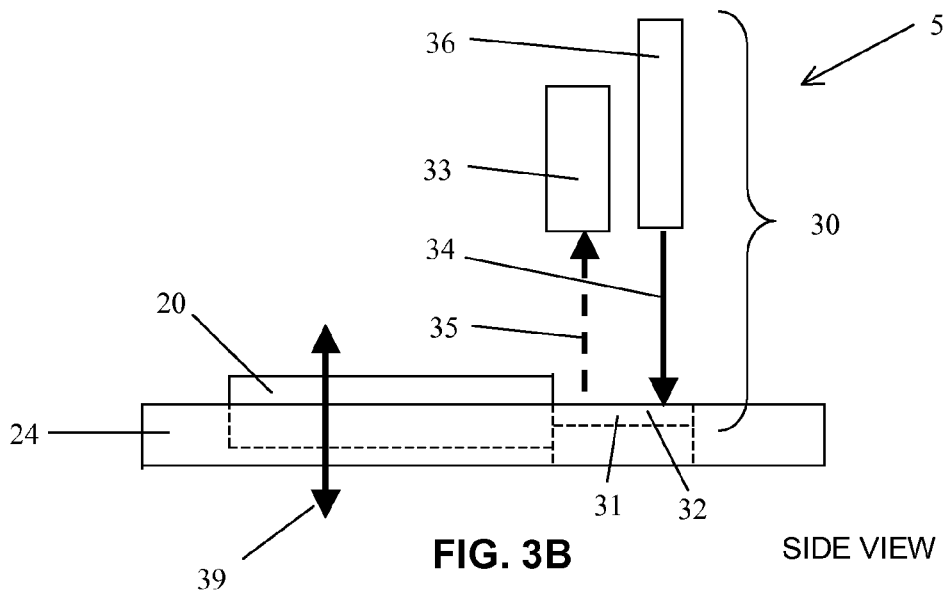
FIG. 3B  SIDE VIEW

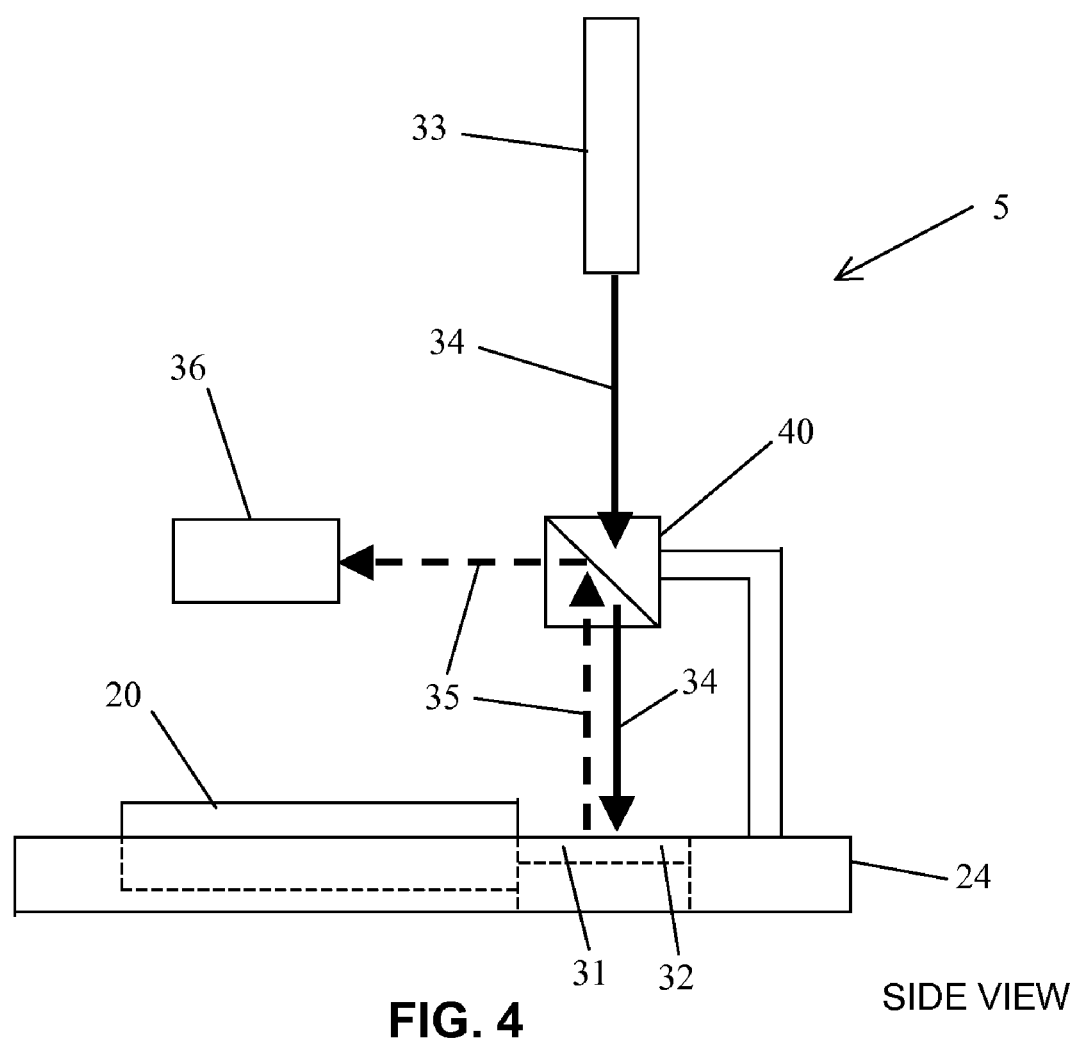
FIG. 4  SIDE VIEW

GRAVITATIONAL METHOD AND APPARATUS FOR MEASURING TRUE VERTICAL DEPTH IN A BOREHOLE

CROSS REFERENCE TO RELATED APPLICATION

The present application claims priority to U.S. Provisional Patent Application Ser. No. 60/956,544, filed Aug. 17, 2007, the entire contents of which are specifically incorporated herein by reference.

BACKGROUND OF THE INVENTION

1. Field of the Invention

The invention disclosed herein relates to determining a true vertical depth in a borehole. In particular, the invention measures gravitational acceleration in the borehole for this determination.

2. Description of the Related Art

In exploration for hydrocarbons, it is important to make accurate measurements of geologic formations. The geologic formations below the surface of the earth may contain reservoirs of oil and gas. The geologic formations may include formation layers and various structures. In a quest for oil and gas, it is important to know about the location and composition of the formation layers and the various structures. In particular, it is important to know about the geologic formations with a high degree of accuracy so that resources are not wasted. Measuring properties of the geologic formations provides information that can be useful for locating the reservoirs of oil and gas. Generally, the oil and gas are retrieved by drilling boreholes into the subsurface of the earth. The boreholes also provide access for taking measurements of the geologic formations.

Well logging is a technique used to take measurements of the geologic formations from the borehole. In one embodiment, a "logging instrument" is lowered on the end of a wireline into the borehole. The logging instrument sends data via the wireline to the surface for recording. Output from the logging instrument comes in various forms and may be referred to as a "log." Many types of measurements are made to obtain information about the geologic formations. Some examples of the measurements include gamma ray logs, nuclear magnetic resonance logs, neutron logs, resistivity logs, and sonic or acoustic logs.

Typically, a common factor among the logs is that a borehole depth is associated with the measurements. For example, each time a resistivity measurement is made, the measurement is associated with the borehole depth at which the measurement was made. In general, many logs of various measurements are analyzed to make an accurate assessment of the geologic formations. The various measurements may be viewed side-by-side to form a composite picture of the geologic formations. Therefore, it is important to have accurate knowledge of the borehole depth and orientation of the logging tool when each measurement is taken.

The orientation of the logging tool is typically with respect to a vertical axis and magnetic north. Even small errors in determination of the borehole depth can corrupt logging data. An assumption that the logging instrument is moving smoothly through the borehole is not always valid due to rugose and sticky borehole conditions. Additionally, tool centralizers and decentralizers may keep the logging tool from moving smoothly. Horizontal deviations of the borehole may also lead to errors in measuring the borehole depth. It is, therefore, important to know the "true vertical depth" of the logging instrument. The horizontal deviations are not relevant to the true vertical depth.

What are needed are an apparatus and a method for making measurements of the true vertical depth of the logging instrument.

BRIEF SUMMARY OF THE INVENTION

The shortcomings of the prior art are overcome and additional advantages are provided through a method for measuring true vertical depth in a borehole, the method including: measuring gravitational acceleration in the borehole; and determining the true vertical depth from the measurement.

Also disclosed is a method for determining a change in true vertical depth (TVD) in a borehole, the method including: performing a first measurement of gravitational acceleration; performing a second measurement of gravitational acceleration; and determining the change in TVD wherein $\Delta(TVD) = \Delta g/(0.0419 \bar{\rho} p)$ where $\Delta(TVD)$ represents the change in TVD, $\Delta g$ represents the change in gravitational acceleration, and $\bar{\rho}$ represents an average density for all formations along the borehole from a location for the first measurement to a location for the second measurement.

Further disclosed is a logging instrument for determining true vertical depth in a borehole, the instrument having: a gravimeter; and a processor adapted for: receiving a measurement of gravitational acceleration in the borehole from the gravimeter; and determining the true vertical depth from the measurement.

BRIEF DESCRIPTION OF THE DRAWINGS

Referring now to the drawings wherein like elements are numbered alike in the several Figures:

FIGS. 3A and 3B illustrate an exemplary embodiment of the gravimeter with an interferometric displacement sensor;

FIG. 4 illustrates an exemplary embodiment of the gravimeter with a beam splitter;

DETAILED DESCRIPTION OF THE INVENTION

Figure 1:
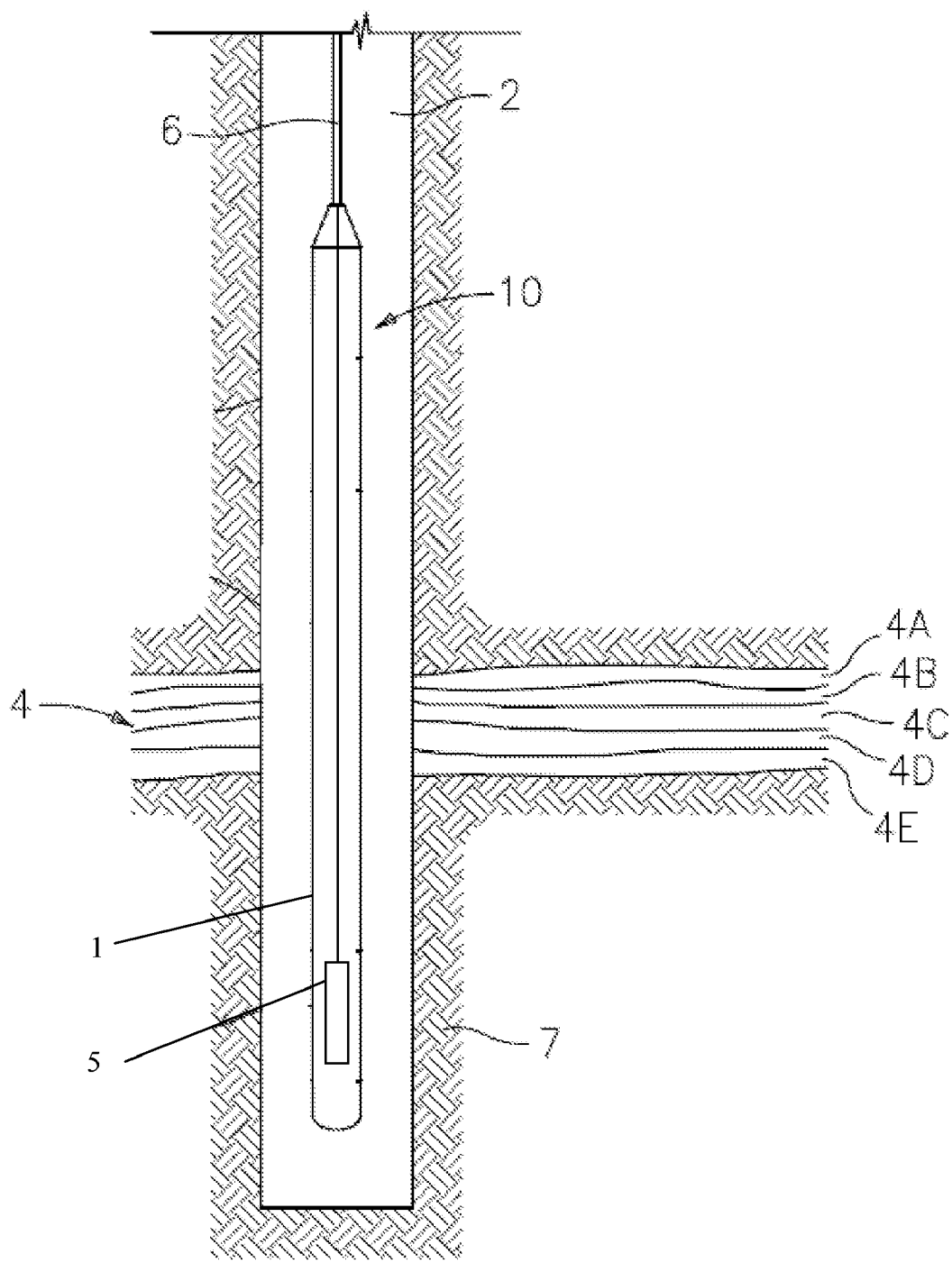
FIG. 1 illustrates an exemplary embodiment of a logging instrument in a borehole penetrating the earth.

The teachings provide embodiments of apparatus and methods for measuring true vertical depth. Included are gravitational accelerometers (or gravimeters) for measuring gravitational acceleration. The gravitational acceleration at a point in the borehole can be correlated to the true vertical depth.

For some perspective, it is known that gravitational acceleration at a location changes according to various factors. For example, the gravitational acceleration at the location can be influenced by a size and an orientation of any mass near or surrounding the location (where orientation includes a direction and a distance from the respective mass to the location). Accordingly, in a borehole, gravitational acceleration at any given location (or "point" as also used herein) is influenced by the mass of geologic formations oriented about the location.

Generally, contributions from the geologic formations are rotationally symmetric with respect to compass directions, such that a direction for the gravitational acceleration is usually pointed directly towards the center of the Earth. Only rarely will an anomalously large mass concentration break this symmetry so that the direction of gravitational acceleration becomes slightly skewed away from the center of the Earth and towards this mass concentration. Above the surface of the Earth, gravitational acceleration declines as the inverse of the square of the distance to the center of the Earth.

Accordingly, gravitational acceleration in the borehole varies with depth in the borehole. If the density of the Earth were constant from the surface to the center, then below the surface of the Earth, the gravitational acceleration would decline linearly. At any given depth, a value for the gravitational acceleration would be proportional to the remaining distance to the center of the Earth. The value would eventually reach zero at the center of the Earth. However, the Earth is more dense at the center than at the surface. Accordingly, a better model for gravitational acceleration is needed.

A better model for determining gravitational acceleration of the Earth involves a series of thin concentric and uniform spherical shells, each shell with a different density. In this model, for points located inside of a selected shell, there is net contribution of zero to the gravitational acceleration caused by a mass of the selected shell. Therefore, in a borehole, the drop in gravitational acceleration is proportional to a product of the true vertical depth and an average density of the Earth between the surface and a point in the borehole, where these two locations define a spherical shell of the Earth above the true vertical depth. This relationship is given in Equation 3 (presented below).

Accordingly, uses of the gravitational accelerometer include measuring gravitational acceleration at selected points in the borehole. A change in true vertical depth can be determined from a change in the gravitational acceleration between two selected points and the average formation density between those two points.

Generally, output of the gravitational accelerometer is correlated to the depth in the borehole. The output may be referred to as "true vertical depth" (TVD) because the gravitational acceleration generally does not vary with horizontal deviations of the borehole or stretching of the wireline. By measuring the true vertical depth, the gravitational accelerometer can account for the horizontal deviations and the logging instrument not moving smoothly through the borehole.

Referring to FIG. 1, a well logging instrument 10 is shown disposed in a borehole 2. The logging instrument 10 includes an instrument housing 1 adapted for use in the borehole 2. The borehole 2 is drilled through earth 7 and penetrates formations 4, which include various formation layers 4A-4E. The logging instrument 10 is typically lowered into and withdrawn from the borehole 2 by use of an armored electrical cable 6 or similar conveyance as is known in the art. A gravimeter 5 is shown disposed within the logging instrument 10. Generally, the gravimeter 5 may be coupled to a device for at least one of processing and recording a measurement of the gravimeter 5. The device may be located at least one of in the logging instrument and at the surface of the earth 7.

In some embodiments, the borehole 2 includes materials such as would be found in oil exploration, including a mixture of liquids such as water, drilling fluid, mud, oil and formation fluids that are indigenous to the various formations. One skilled in the art will recognize that the various features as may be encountered in a subsurface environment may be referred to as "formations." Accordingly, it should be considered that while the term "formation" generally refers to geologic formations of interest, that the term "formations," as used herein, may, in some instances, include any geologic points of interest (such as a survey area).

For the purposes of this discussion, it is assumed that the borehole 2 is vertical and that the formations 4 are horizontal. The teachings herein, however, can be applied equally well in deviated or horizontal wells or with the formation layers 4A-4E at any arbitrary angle. The teachings are equally suited for use in logging while drilling (LWD) applications and in open-borehole and cased-borehole wireline applications. In LWD applications, the gravimeter 5 may be disposed in a drilling collar. When used in LWD applications, drilling may be halted temporarily to prevent vibrations while the gravimeter 5 is performing a measurement.

In general, in the borehole, gravity decreases as depth increases. Relative to a value of gravity at the surface of the borehole, a decline in gravitational acceleration $\Delta g$ at some true vertical depth is provided by EQ. 1:

$$\Delta g = 4\pi G \rho h \quad \text{(Eq. 1);}$$

where:
 $\pi$ represents a constant (approximately 3.14159);
 G represents a universal gravitational constant ($6.67 \times 10^{-11}$ $Nm^2/kg^2$);
 $\rho$ represents an average density over an interval of interest (gm/cc); and
 h represents a true vertical depth (TVD, in meters).

With regard to the foregoing, a rate of decrease in gravitational acceleration with increasing depth depends on an average bulk density of the formation 4. The average bulk density is substituted for $\rho$ in EQ. 1.

There are several ways to obtain the average bulk density. One way is to use an average of 2.67 gm/cc for upper crustal rocks of the earth 7. A formation density instrument may provide a more accurate measurement of the average bulk density by measuring local bulk densities directly. Another way is to measure the porosity of the formation 4 with a nuclear magnetic resonance log or a neutron log and then assume an average grain density of 2.67 gm/cc to determine the local bulk density. Then, a thickness-weighted average formation density may be calculated. The thickness-weighted average formation density may be calculated using a density log such as the gamma-gamma log and estimated changes in TVD. That is, the thickness-weighted average formation density should account for borehole inclination. For example, if for x feet of the log of some zone of constant density, $\rho$, the borehole is at an inclination angle of $\theta$ with respect to vertical, then the thickness weighted average formation density for that zone becomes (x cos $\theta$)$\rho$. With the density log and associated depths, an average bulk density can be calculated for the formations 4 from the surface to a selected depth. The measurements from the logs do not require a high level of accuracy to provide a good average bulk density of all the formations 4 between the surface and a subsurface location in the borehole 2.

A change in the gravitational acceleration $\Delta g$ from the surface to the true vertical depth may be determined with respect to EQ. 2:

$$\Delta g = (0.0419 \overline{\rho}) * \Delta(TVD) \quad \text{(Eq. 2);}$$

where:
 $\Delta g$ represents a total change in gravity (in milligal) from the surface down to the TVD (in meters); and $\bar{\rho}$ represents average density for all formations from the surface to the TVD (in gm/cc).

Generally, a bulk density of the geologic formation is used to correlate the gravitational acceleration with the TVD. There are several ways to determine the bulk density. One way is to assume an average based upon known geologic data in a region adjacent to the borehole. Another way is to measure porosity of the formation using a nuclear magnetic resonance logging tool for example. Knowing the porosity, the bulk density can be computed. An average grain density of 2.67 gm/cc as may be used for the computation.

EQ. 2 may be rearranged to determine the true vertical depth, as provided in EQ. 3:

$$\Delta(TVD)=\Delta g/(0.0419\bar{\rho}) \quad \text{(Eq. 3)}.$$

Accordingly, a calculation for determining the TVD may be performed for each drilling pipe connection or wireline survey point. For example, for a $\Delta g$ of 0.1 milligal (~0.1 µg) and an average bulk density of 2.67 gm/cc, the change in TVD is (0.1)/(0.0419*2.67)=0.89 meter. Note that one gal. equals 1 cm/see or approximately one-thousandth the acceleration of gravity, g, at the surface of the earth 7. The value of g is about 980 cm/sec$^2$.

Depth uncertainty using conventional depth measuring methods during drilling is about one meter per 1000 meters. Therefore, an improvement over the conventional depth measuring methods requires the gravimeter 5 to have a level of accuracy better than 0.1 milligal. The level of accuracy has to be stable at all attitudes and all temperatures during the drilling and logging processes.

The gravimeter 5 measures a difference in gravitational acceleration by measuring a microscopic displacement of a proof mass supported by a suspension such as springs. The proof mass will move a certain amount based on an amount of difference in gravitational force imposed on the proof mass. The amount of the gravitational force is related to an amount of the gravitational acceleration at the proof mass. The amount of the gravitational acceleration can be calculated with knowledge of the mass of the proof mass and the gravitational force.

The gravimeter 5 is based on at least one of a micro-electromechanical-system (MEMS) and a nano-electromechanical-system (NEMS). At least a portion of the gravimeter 5 can be constructed from a single-crystal silicon wafer using techniques familiar to one skilled in the solid state arts. The techniques can include photolithography, electron beam lithography, and micromachining. Sandia National Laboratories of Albuquerque, N. Mex. demonstrated the feasibility of such techniques by building accelerometers implemented by at least one of MEMS and NEMS.

Figure 2A:
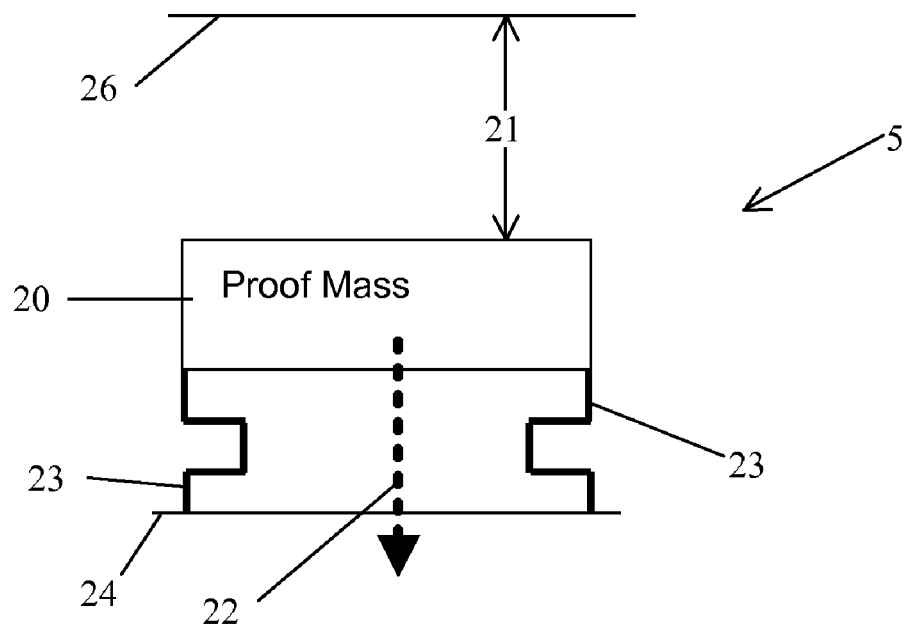
FIGS. 2A and 2B, collectively referred to as FIG. 2, illustrate an exemplary embodiment of a gravimeter.
Figure 2B:
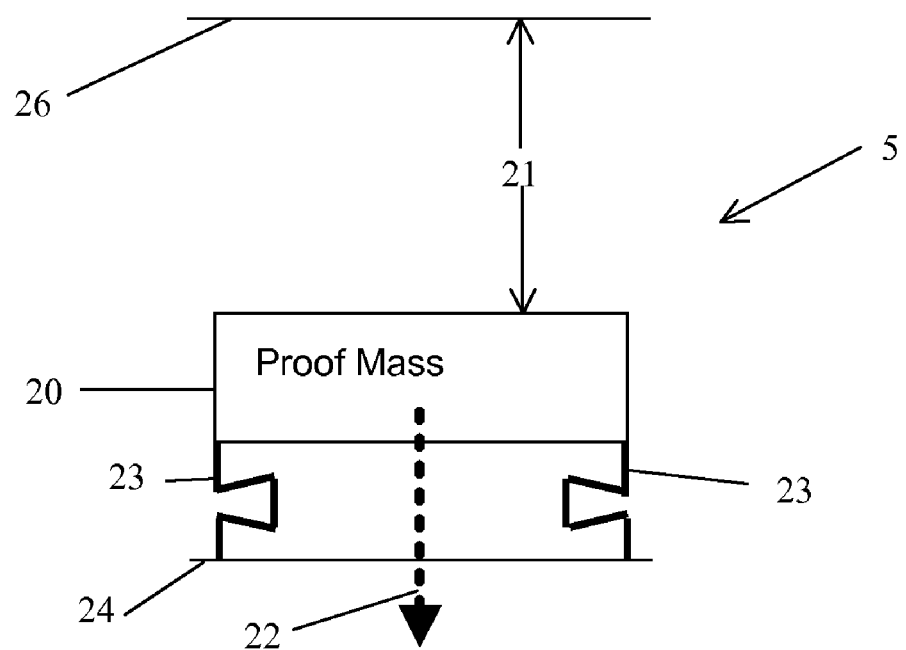

FIG. 2 illustrates an exemplary embodiment of the gravimeter 5. Referring to FIG. 2A, the gravimeter 5 includes a proof mass 20 suspended by a suspension 23. The suspension 23 allows displacement of the proof mass 20. The suspension 23 also provides resistance to the displacement of the proof mass 20. The resistance is in a direction opposing the force of gravity (or gravitational force). The proof mass 20 at one location undergoes a displacement 21 due to a gravitational force 22 acting upon the proof mass 20. The displacement 21 is with respect to a reference 26. The reference 24 can be part of a support substrate 24. FIG. 2B illustrates an exemplary embodiment of the gravimeter 5 with an increase in the gravitational force 22 at another location. Referring to FIG. 2B, the proof mass 20 undergoes an increase in the displacement 21 due to an increase in the gravitational force 22. The increase in gravitational acceleration can be determined from a difference between the displacement 21 at the location represented in FIG. 2B and the displacement 21 at the location represented in FIG. 2A. Alternatively, the increase in gravitational acceleration can be determined from the difference in the gravitational acceleration derived from the displacement 21 in FIG. 2A and the gravitational acceleration derived from the displacement 21 in FIG. 2B.

The suspension 23 can exhibit characteristics that are at least one of linear and non-linear. Linear characteristics provide for a force exerted by the suspension 23 that is directly proportional to an extension of the suspension 23. If the suspension 23 is non-linear, then linearization circuitry can be used to compensate for the non-linear characteristics. Before the gravimeter 5 is discussed in detail, certain definitions are provided.

The term "single mode" relates to a single ray or beam of light. The term "diffraction grid" relates to a grid of longitudinal elements that are generally parallel to each other. Light incident to the diffraction grid is generally diffracted into more than one beam.

The gravimeter 5 can measure the displacement 21 using an interferometric displacement sensor. The interferometric displacement sensor includes an array of intertwined grid elements that act as a diffraction grid. An amount of offset between the grid elements is related to the displacement 21 of the proof mass 20. There are at least two ways for the interferometric displacement sensor to measure the displacement 21. One way calls for the interferometric displacement sensor to measure an intensity of a single mode of light diffracted off of the array of intertwined grid elements. Another way calls for the interferometric displacement sensor to measure the intensity of a single mode of light diffracted through the array of intertwined grid elements.

The difference in the displacements 21 due to changes in the gravitational force 22 are typically small. The use of MEMS and NEMS technology provides for constructing the diffraction grid with small dimensions in a spacing of the intertwined grid elements. The small dimensions are typically about at least one of micrometer-scale and nanometer-scale. With the small dimensions, a small change in the displacement 21 can result in a large change in the intensity of light at least one of refracted off of and diffracted through the array of intertwined grid elements. A laser is typically used as a light source. The laser generally provides light with a wavelength less than the dimensions of the refraction grid. Because of the small wavelength, a change in the displacement 21 has a disproportionate effect. With the refraction grid having small dimensions, displacements 21 as small as picometers or less can be measured.

FIG. 3 illustrates an exemplary embodiment of an interferometric displacement sensor 30. In the embodiment of FIG. 3, the suspension 23 is orthogonal to the suspension 23 in the embodiment of FIG. 2. FIG. 3A illustrates an exemplary top view of the interferometric displacement sensor 30. Referring to FIG. 3A, the interferometric displacement sensor 30 includes a moveable array of grid elements 31 fixed to the proof mass 20. The interferometric displacement sensor 30 also includes a stationary array of grid elements 32 fixed to the support substrate 29. As the proof mass 20 moves, the moveable array of grid elements 31 moves with respect to the stationary array of grid elements 32. With respect to FIG. 3A, the proof mass 20 moves in a direction normal to the X-Y plane. The displacement 21 is related to a movement of the moveable array of grid elements 31 with respect to the stationary array of grid elements 32. The plane formed by the moveable array of grid elements 31 moves normal to the plane formed by the stationary array of grid elements 32. The amount of offset or displacement 21 is an amount of separation between the planes.

FIG. 3B illustrates an exemplary side view of the interferometric displacement sensor 30. Referring to FIG. 3B, a coherent light source 33 illuminates a diffraction pattern created by the moveable array of grid elements 31 and the stationary array of grid elements 32. The coherent light source 33 provides coherent light 34. The coherent light 34 is diffracted from the diffraction pattern and provides diffracted light 35. An intensity of the refracted light 35 is measured by a photodetector 36. The intensity of the diffracted light 35 is related to an amount of the displacement 21 that is in turn related to the gravitational acceleration. FIG. 3B also depicts directions 39 that the proof mass 20 may move in.

The gravimeter 5 may include various embodiments of the interferometric displacement sensor 30. The embodiments provide for different configurations of the coherent light source 33 and the photodetector 36. FIG. 4 illustrates an exemplary embodiment of the gravimeter 5 with a beam splitter 40. The beam splitter 40 provides for preventing the photodetector 36 from interfering with the coherent light 34.

Figure 5:
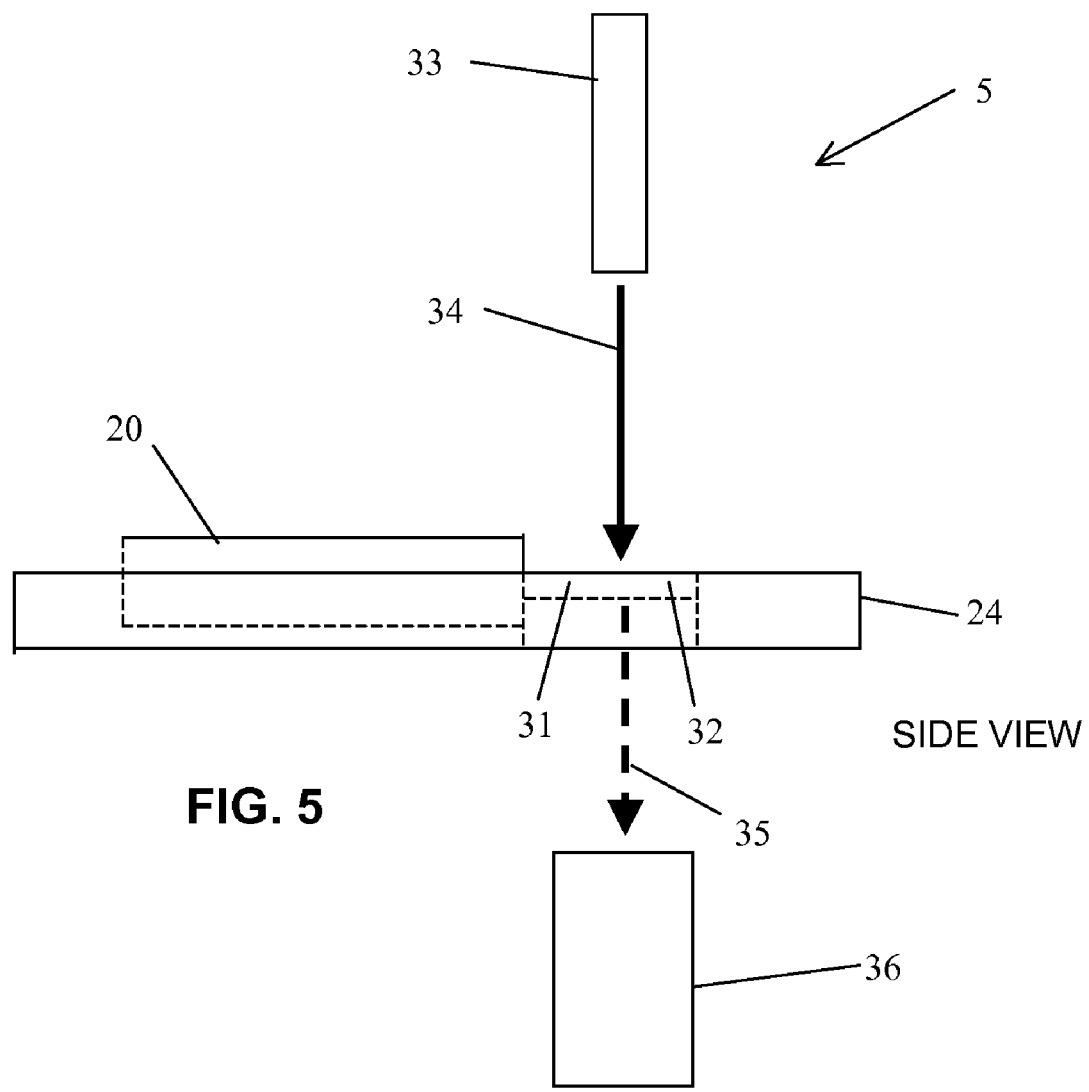
FIG. 5 illustrates an exemplary embodiment of the interferometric displacement sensor.

In another embodiment of the interferometric displacement sensor 30, the photodetector 36 measures the intensity of a single mode of light diffracted through the diffraction grid. Referring to FIG. 5, the coherent light source 33 and the photodetector 36 are disposed on opposite sides of the diffraction grid formed by the grid elements 31 and 32.

The gravimeter 5 can include many embodiments. The gravimeter 5 can be designed to measure acceleration in one, two, or three dimensions. The gravimeter 5 discussed above for teaching purposes measures acceleration in one dimension. The gravimeter 5 can include more than one proof mass 20 and interferometric displacement sensor 40. Movement of the proof masses 20 can be arranged so that the displacements 21 are orthogonally to each other to measure acceleration in more than one dimension. Alternatively, the proof mass 20 can be fabricated to move in more than one dimension. The interferometric displacement sensor 40 can be fabricated to measure the displacement of the proof mass 20 in more than one dimension. Also, the gravimeter 5 can incorporate several interferometric displacement sensors 40. For example, one interferometric displacement sensor 40 can be assigned for each dimension that the proof mass 20 moves.

Generally, the well logging instrument 10 includes adaptations as may be necessary to provide for operation during drilling or after a drilling process has been undertaken.

Figure 6:
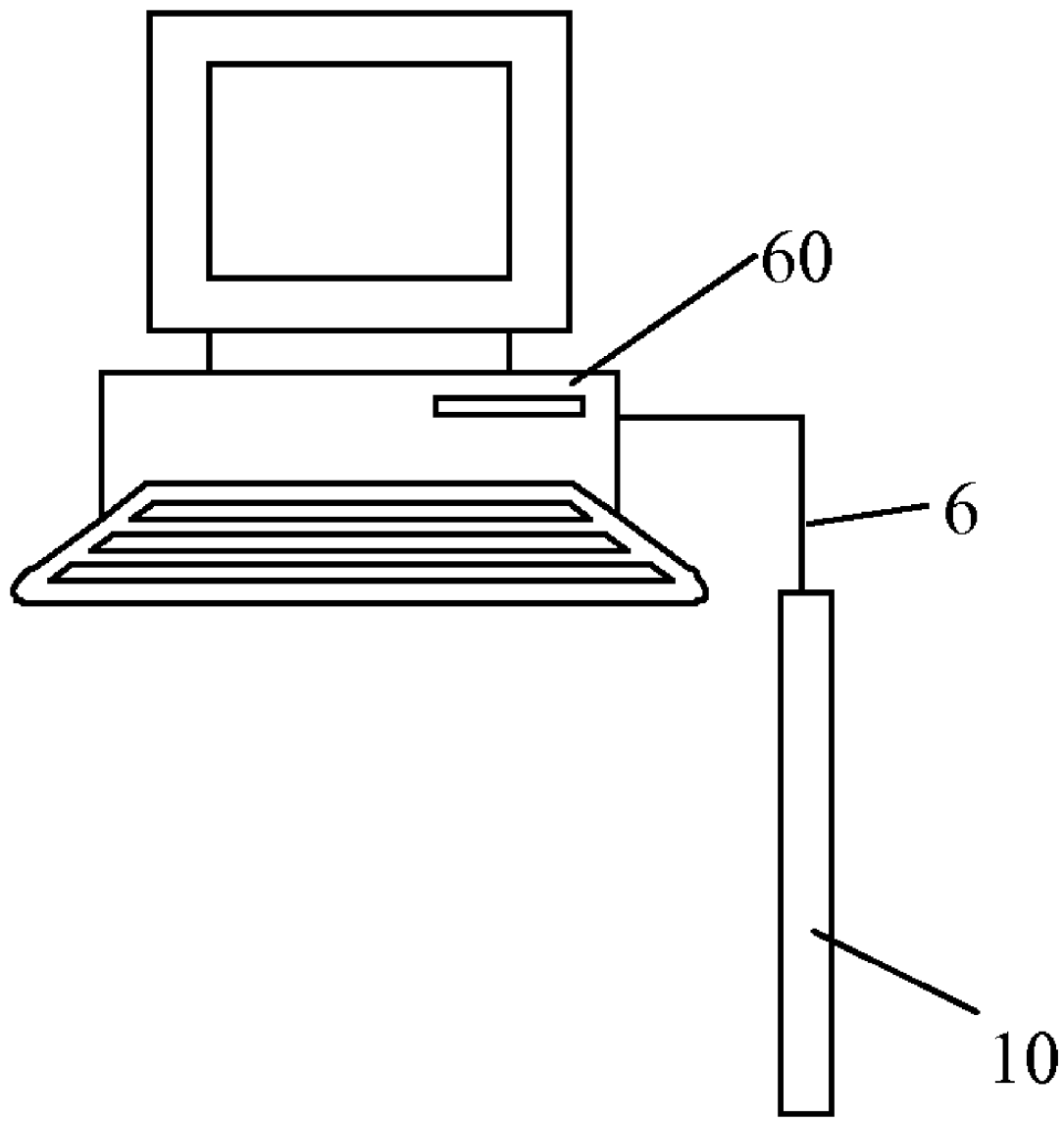
FIG. 6 illustrates an exemplary embodiment of the logging instrument connected to a computer.

Referring to FIG. 6, an apparatus for implementing the teachings herein is depicted. In FIG. 6, the apparatus includes a computer 60 coupled to the well logging instrument 10. Typically, the computer 60 includes components as necessary to provide for the real time processing of data from the well logging instrument 10. Exemplary components include, without limitation, at least one processor, storage, memory, input devices, output devices and the like. As these components are known to those skilled in the art, these are neither depicted in any detail nor discussed further herein.

Typically, the teachings herein are reduced to an algorithm that is stored on machine-readable media. The algorithm is implemented by the computer 60 and provides operators with desired output. The output is typically generated on a real-time basis.

The gravimeter 5 may be used to provide real-time measurements of gravitational acceleration. As used herein, generation of data in "real-time" is taken to mean generation of data at a rate that is useful or adequate for making decisions during or concurrent with processes such as production, experimentation, verification, and other types of surveys or uses as may be opted for by a user or operator. As a non-limiting example, real-time measurements and calculations may provide users with information necessary to make desired adjustments during the drilling process. In one embodiment, adjustments are enabled on a continuous basis (at the rate of drilling), while in another embodiment, adjustments may require periodic cessation of drilling for assessment of data. Accordingly, it should be recognized that "real-time" is to be taken in context, and does not necessarily indicate the instantaneous determination of data, or make any other suggestions about the temporal frequency of data collection and determination.

A high degree of quality control over the data may be realized during implementation of the teachings herein. For example, quality control may be achieved through known techniques of iterative processing and data comparison. Accordingly, it is contemplated that additional correction factors and other aspects for real-time processing may be used. Advantageously, the user may apply a desired quality control tolerance to the data, and thus draw a balance between rapidity of determination of the data and a degree of quality in the data. Because of the small size of the gravimeter 5 implemented by at least one of MEMS and NEMS, an array of N gravimeters 5 may be disposed in the logging instrument 10. An average of the outputs of the array may be used to improve the signal to noise ratio (SNR) by a factor of N. Alternatively, the average of the outputs may be used to shorten a wait time at each point in the borehole 2 where gravity is measured and maintain the same SNR as if using one gravimeter 5 with a longer wait time.

Figure 7:
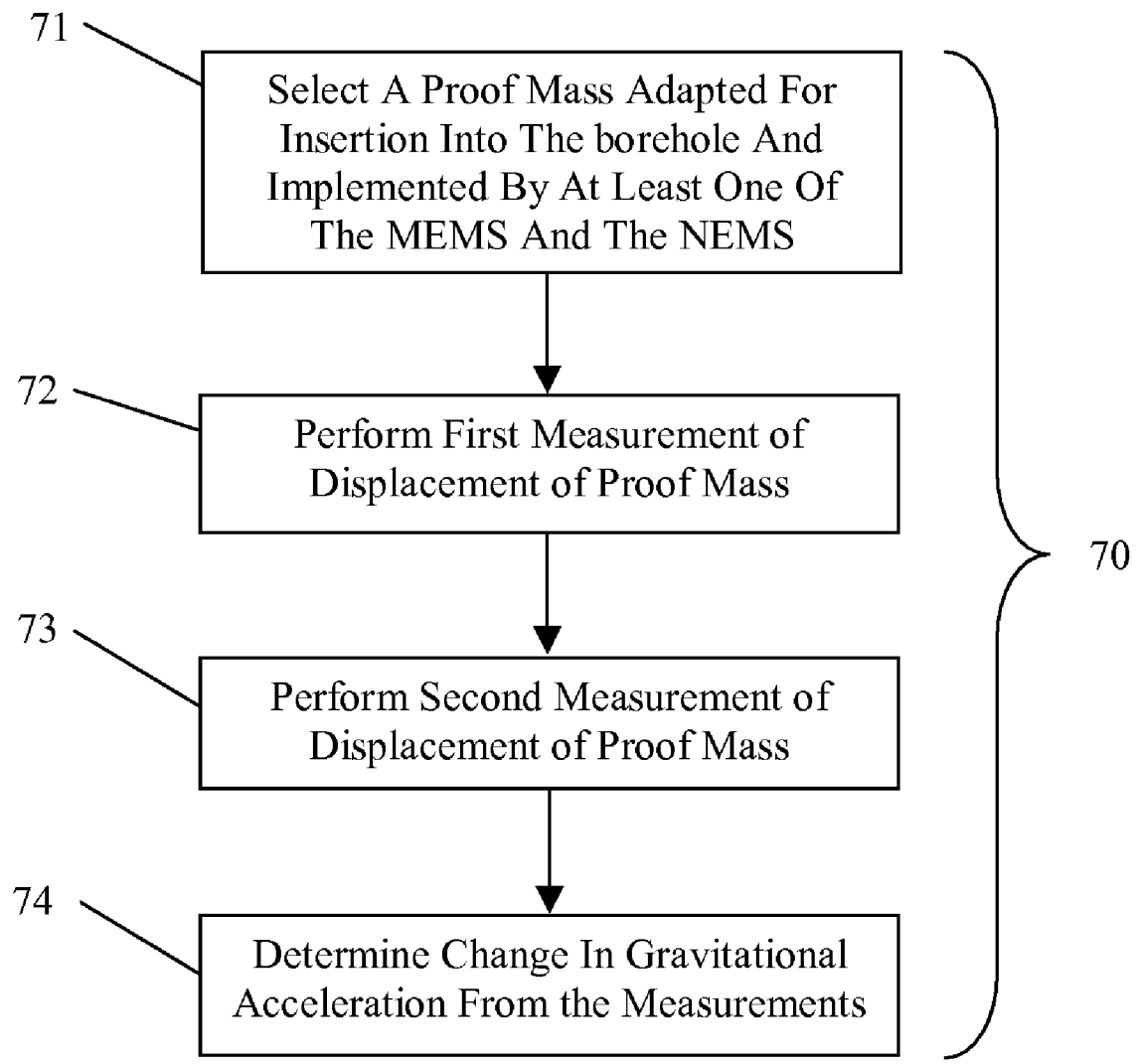
FIG. 7 illustrates an exemplary method for measuring a difference in gravitational acceleration.

FIG. 7 presents an exemplary method 70 for measuring a change in gravitational acceleration in the borehole 2. The method 70 calls for selecting 71 the proof mass 20 adapted for insertion into the borehole 2 and wherein the proof mass 20 is implemented by at least one the MEMS and the NEMS. The method 70 calls for performing 72 a first measurement of the displacement 21. Generally, the first measurement may be performed in the borehole 2 at the surface of the earth 7 or outside of the borehole 2 at the surface of the earth 7. In one embodiment, the first measurement may be a calibration of the gravimeter 5 with subsequent measurements of the displacement 21 (and therefore the gravitational acceleration) referenced to the calibration. The method 70 calls for performing 73 a second measurement of the displacement 21. The second measurement is generally performed in the borehole 2 below the surface of the earth 7. The method 70 calls for determining 74 the change in gravitational acceleration using the two measurements. In general, the change in gravitational acceleration may be determined using at least one of two methods. A first method calls for determining the change in gravitational acceleration using a difference between the first measurement and the second measurement. Generally, when the first method is used, the suspension 23 is linear. A second method calls for determining the difference in gravitational acceleration by subtracting the gravitational acceleration derived from the second measurement from the gravitational acceleration derived from the first measurement. In general, when the second method is used, the suspension 23 may be one of linear and non-linear. Determining 74 the change in gravitational acceleration may include determining the TVD at a location where the second measurement was performed. The first measurement and the second measurement may also be performed in the same location in the borehole 2.

If the first measurement is performed in the borehole 2 below the surface of the earth 7 and in proximity to the formation 4, then the second measurement may be performed in the same location but at a later time. By not changing location, the gravimeter 5 can monitor changes in gravitational acceleration resulting from depletion of hydrocarbons in the formation 4. Similarly, the gravimeter 5 can measure changes in gravitational acceleration resulting from injection of carbon dioxide or water into the formation 4.

Figure 8:
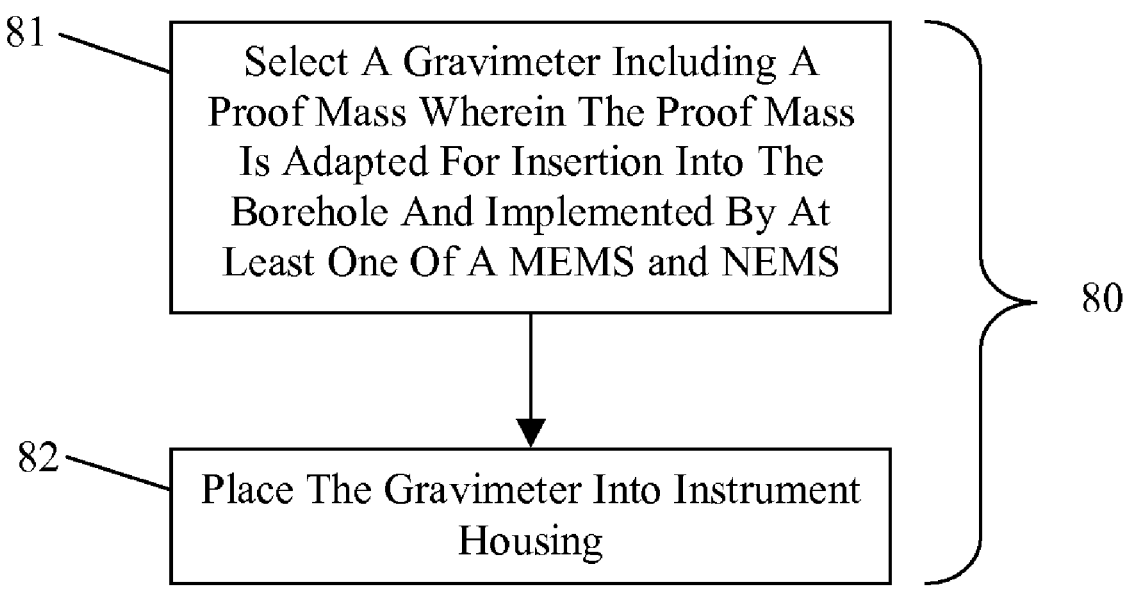
FIG. 8 illustrates an exemplary method for producing the logging instrument.

FIG. 8 presents an exemplary method 80 for producing the logging instrument 10 for measuring gravitational acceleration in a borehole. The method 80 calls for selecting 81 a gravimeter 5 that includes the proof mass 20 wherein the proof mass 20 is adapted for insertion into the borehole and implemented by at least one of the MEMS and the NEMS. The method 80 calls for placing 82 the gravimeter 5 into the instrument housing 1.

It may be advantageous to in some situations to provide for a certain amount of offset of the grid elements 31 with respect to the grid elements 32 (such as zero for example) for one of the first measurement and the second measurement. The offset can be provided by a force feedback control system as known in the art. The force feedback control system can also be used to compensate for affects due to a tilt of the gravimeter 5.

In certain embodiments, the gravimeter 5 may be disposed in more than one logging instrument 10. In these embodiments the responses from the gravimeters 5 may be combined to produce a composite response. Using multiple gravimeters 10 to produce the composite response is considered inherent to the teachings herein and a part of the invention disclosed.

The gravimeter 5 may be used to measure at least one of relative gravitational acceleration and absolute gravitational acceleration. Measurement of relative gravitational acceleration involves comparing the displacement 21 from two measurements. Measurement of absolute gravitational acceleration involves calibrating the gravimeter 5 to a standard of gravitational acceleration to provide a calibration point. The calibration involves correlating the standard of gravitational acceleration to the displacement 21 measured by the gravimeter 5. The absolute gravitational acceleration at a location can then be measured by determining a difference in the displacement 21 from the calibration point.

In support of the teachings herein, various analysis components may be used, including digital and/or analog systems. For example, the digital and/or analog systems may be used for the linearization circuitry and the force feedback control system. The gravimeter 5 may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling unit, heating component, motive force (such as a translational force, propulsional force or a rotational force), sensor, transmitter, receiver, transceiver, controller, optical unit, optical lens, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for measuring true vertical depth in a borehole, the method comprising:
   measuring gravitational acceleration in the borehole; and
   determining the true vertical depth from the measurement.

2. The method as in claim 1, wherein the method is implemented by a computer program product stored on a non-transitory machine-readable medium.

3. The method as in claim 1, further comprising selecting a proof mass for measuring the gravitational acceleration, the proof mass adapted for insertion into the borehole.

4. The method as in claim 3, wherein the proof mass is implemented by at least one of a micro-electromechanical system (MEMS) and a nano-electromechanical system (NEMS).

5. The method as in claim 3, wherein the measuring comprises measuring a displacement of the proof mass.

6. The method as in claim 5, wherein measuring the displacement comprises measuring a characteristic of light that is at least one of diffracted off of a diffraction grid and diffracted through the diffraction grid, the diffraction grid coupled to the proof mass.

7. The method as in claim 6, wherein the characteristic is intensity.

8. A method for determining a change in true vertical depth (TVD) in a borehole, the method comprising:
   performing a first measurement of gravitational acceleration;
   performing a second measurement of gravitational acceleration; and
   determining the change in TVD wherein $$\Delta(TVD)=\Delta g/(0.0419\overline{\rho})$$

where
- $\Delta$(TVD) represents the change in TVD,
- $\Delta g$ represents the change in gravitational acceleration, and
- $\overline{\rho}$ represents an average density for all formations along the borehole from a location for the first measurement to a location for the second measurement.

9. The method as in claim 8, wherein the average density is about 2.67 grams per cubic centimeter.

10. The method as in claim 8, further comprising measuring the density, $\rho$, for all formations along the borehole from the location of the first measurement to the location of the second measurement.

11. The method as in claim 1, further comprising calculating the average density, $\overline{\rho}$.

12. A logging instrument for determining true vertical depth in a borehole, the instrument comprising:
- a gravimeter; and
- a processor adapted for:
  - receiving a measurement of gravitational acceleration in the borehole from the gravimeter; and
  - determining the true vertical depth from the measurement.

13. The instrument as in claim 12, wherein the gravimeter comprises:
- a proof mass implemented by at least one of a micro-electromechanical-system (MEMS) and a nano-electromechanical-system (NEMS); and
- a displacement sensor for measuring displacement of the proof mass.

14. The instrument as in claim 13, further comprising a suspension coupled to the proof mass.

15. The instrument as in claim 14, wherein the suspension comprises at least one spring.

16. The instrument as in claim 15, wherein the at least one spring comprises a linear spring constant.

17. The instrument as in claim 13, wherein the displacement sensor comprises an interferometric displacement sensor.

18. The instrument as in claim 17, wherein the interferometric displacement sensor comprises:
- a light source;
- an array of moveable grid elements coupled to the proof mass;
- an array of stationary grid elements wherein each array of grid elements is implemented by at least one of the micro-electromechanical-system (MEMS) and the nano-electromechanical-system (NEMS); and
- a photodetector.

19. The instrument as in claim 18, wherein the light source comprises a laser.

20. The instrument as in claim 18, wherein at least one of the proof mass, the suspension, the array of moveable grid elements, and the array of stationary grid elements comprise silicon.

* * * * *